United States Patent
Watanabe et al.

(10) Patent No.: US 6,970,460 B2
(45) Date of Patent: Nov. 29, 2005

(54) MULTIPLEXING APPARATUS

(75) Inventors: Toru Watanabe, Koriyama (JP);
Kan-ichi Sato, Koriyama (JP);
Tatsuhiko Ando, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 779 days.

(21) Appl. No.: 09/781,998

(22) Filed: Feb. 14, 2001

(65) Prior Publication Data

US 2001/0036202 A1    Nov. 1, 2001

(30) Foreign Application Priority Data

Feb. 17, 2000    (JP) .............................. 2000-039394

(51) Int. Cl.$^7$ .......................... H04L 12/28; H04L 12/56
(52) U.S. Cl. ................. 370/389; 370/395.42; 370/466; 370/535; 370/474; 370/412; 370/401
(58) Field of Search ...................... 370/395.1, 395.52, 370/474, 535, 538, 503, 466, 412–416, 395.5, 370/463, 389, 352–356, 395.4, 395.41, 395.42, 370/395.43, 401, 428, 465

(56) References Cited

U.S. PATENT DOCUMENTS

| | | | |
|---|---|---|---|
| 6,084,889 A * | 7/2000 | Murakami | 370/474 |
| 6,314,098 B1 * | 11/2001 | Masuda et al. | 370/392 |
| 6,731,635 B1 * | 5/2004 | Brueckheimer et al. | 370/395.1 |
| 2004/0042420 A1 * | 3/2004 | Agarwal et al. | 370/310.1 |

* cited by examiner

*Primary Examiner*—Ajit Patel
(74) *Attorney, Agent, or Firm*—Mattingly, Stanger, Malur & Brundidge, P.C.

(57) ABSTRACT

A circuit size of a multiplexing apparatus is reduced. In terminal interface units 21a to 23a, data from a terminal is received by each of terminal-side line interface sub-unit 211, and then celluralized by a cell assembly/disassembly sub-unit 28a. The cell is transmitted directly to a priority control unit 242a. In the priority control unit 242a, the cell received from each of the terminal interface units 21a to 23a is stored in each of priority control buffers 243a, and then sent to an ATM network interface unit 24a in the order of priorities sequentially. The cell is synchronized with a line of an ATM network 1a by a network synchronizing sub-unit 241a, and transmitted to the line of the ATM network 1a. With this constitution, an internal bus is unnecessary.

5 Claims, 5 Drawing Sheets

MULTIPLEXING APPARATUS

BACKGROUND OF THE INVENTION

The present invention relates to a multiplexing apparatus which multiplexes data items received from lines on plural terminal sides to transmit the multiplexed data onto a line on a network side, and demultiplexes the multiplexed data received from the line on the network side to transmit the demultiplexed data items onto the lines on the plural terminal sides.

A constitution of a conventional multiplexing apparatus is shown in FIG. 5.

In FIG. 5, reference numerals 21 to 23 denote terminal interface units. Here, the terminal interface unit 21 is a voice line interface unit which accommodates a PBX (Private Branch Exchange) 5 accommodating voice terminals such as a telephone 6. The terminal interface unit 22 is a data line interface unit for accommodating a data terminal 4. The terminal interface unit 23 is an FR (Frame Relay) line interface unit for accommodating an FR terminal 3. Furthermore, reference numeral 24 denotes a network interface unit for accommodating a line on a network 1 side.

The terminal interface units 21 to 23 and the network interface unit 24 are connected to each other by an internal bus 26, and data is sent/received therebetween via the internal bus 26. Furthermore, reference numeral 25 denotes an internal bus control unit which arbitrates the bus right among devices connected to the internal bus 26.

In the terminal interface units 21 to 23, data transmitted from the terminal is received by the terminal-side line interface sub-unit 211, and then converted to a data block (hereinafter generically called packet type data) as a certain unit, to which a destination is given, by an assembly/disassembly sub-unit 28. The data block is an ATM cell, an IP packet and the like, and determined by a protocol adopted in the network 1. The data block is transmitted to the internal bus 26 from an internal bus interface sub-unit 271. Furthermore, in the terminal interface units 21 to 23, packet type data transmitted from the network interface unit 24 via the internal bus 26 is received by the internal bus interface sub-unit 271 and then disassembled by the assembly/disassembly sub-unit 28, and data is extracted. The extracted data is transmitted from the terminal-side line interface sub-unit 211 to the terminal.

On the other hand, in the network interface unit 24, the packet type data transmitted from each of the terminal interface units 21 to 23 via the internal bus 26 is received by an internal bus interface sub-unit 272, and then sent to a priority control sub-unit 242 via a network synchronizing sub-unit 241. The packet type data is once stored in a priority control buffer 243. Thereafter, packet type data is sequentially synchronized with the line on the network 1 side in the order of descending priorities, the priority being stored in a header of the packet type data, by the network synchronizing sub-unit 241 to be transmitted to the line on the network 1 side. Furthermore, in the network interface unit 24, the packet type data transmitted from the line on the network 1 side is received by the network synchronization sub-unit 241, and then transmitted from the internal bus interface sub-unit 272 to the internal bus 26 to be received by each of the terminal interface units 21 to 23 as described above.

Furthermore, in the network interface unit 24, a clock extraction sub-unit 244 extracts a network clock synchronized with the line on the network 1 side, and sends the extracted network clock to the internal bus control unit 25. From this network clock, a clock generation sub-unit 251 of the internal bus control unit 25 generates operation clocks for the internal bus 26 and the terminal interface units 21 to 23, and distributes the operation clocks to the internal bus 26 and the terminal interface units 21 to 23.

SUMMARY OF THE INVENTION

The conventional multiplexing apparatus adopts the constitution to perform the sending/receiving of the packet type data between the terminal interface units 21 to 23 and the network interface unit 24 via the internal bus 26 as described above. Therefore, the internal bus interface sub-units 271 and 272 must be provided in the terminal interface units 21 to 23 and the network interface unit 24, respectively. Furthermore, the internal bus control unit 25 for arbitrating the bus rights among the devices connected to the internal bus 26 must be provided. These units are a factor to upsize the circuit of the multiplexing apparatus.

The present invention has been made with above problems taken into consideration, and has its object to enable the size of the circuit of the multiplexing apparatus to be reduced.

To achieve the foregoing object, the multiplexing apparatus of the present invention comprises a plurality of terminal interface units respectively accommodating lines on terminal sides; a buffer unit which is connected to each of the terminal interface units by the point-to-point connection; and a network interface unit connected to the buffer unit, the network interface unit accommodating a line on a network side.

Each of the terminal interface units converts data received from the line on the terminal side to packet type data, and transmits the packet type data to the buffer unit via a corresponding point-to-point connection line. Each of the terminal interface units disassembles packet type data received from the buffer unit via the corresponding point-to-point connection line, and extracts data therefrom to transmit the extracted data to the corresponding line on the terminal side.

The buffer unit includes a packet type data storing unit for storing the packet type data received from a plurality of the terminal interface units. The buffer unit reads out the packet type data sequentially from the packet type data storing unit, and transmits the packet type data to the network interface unit. The buffer unit receives packet type data transmitted from the network interface unit, and selects a terminal interface unit in accordance with a destination of the packet type data received. The buffer unit transmits this packet type data to the selected terminal interface unit via the corresponding point-to-point connection line.

The network interface unit receives the packet type data transmitted from the buffer unit, and synchronizes the packet type data with the line on the network side to transmit the packet type data to the line on the network side. Furthermore, the network interface unit receives packet type data transmitted from the line on the network side, and transmits this packet type data to the buffer unit.

According to the present invention, since an internal bus which is necessary for the bus arbitration is not used in the above constitution, the internal bus interface sub-units 271 of the terminal interface units 21 to 23 and the internal bus interface sub-unit 272 of the network interface unit 24 as well as the internal bus control unit 25 for arbitrating the bus right among the devices connected to the internal bus 26, which are shown in FIG. 5, are unnecessary. Thus, it is possible to facilitate downsizing of the circuit size of the multiplexing apparatus.

DETAILED DESCRIPTION OF THE PREFERRED EMBODIMENTS

Embodiments of the present invention will be described below.

At first, a first embodiment of the present invention will be described.

Figure 1:
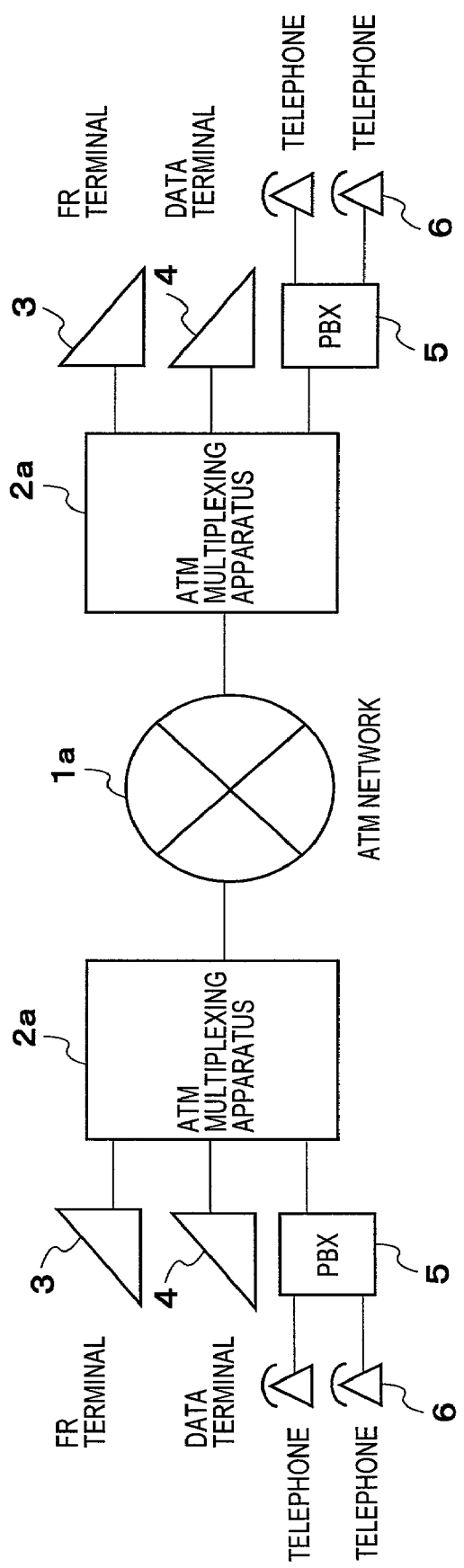
FIG. 1 is a block diagram showing a constitution of a communication system using an ATM multiplexing apparatus to which a first embodiment of the present invention is applied.

In FIG. 1, shown is a constitution of a communication system using an ATM (Asynchronous Transfer Mode) multiplexing apparatus to which the first embodiment of the present invention is applied.

In FIG. 1, reference numeral 1a denotes an ATM network; 3 denotes an FR terminal; 4 denotes a data terminal; 5 denotes a PBX; 6 denotes a voice terminal such as a telephone; and 2a denotes the ATM multiplexing apparatus to which the first embodiment of the present invention is applied.

In such a constitution, the ATM multiplexing apparatus 2a multiplexes data items received from the FR terminal 3, the data terminal 4 and/or the PBX 5, which are accommodated therein, and transmits the multiplexed data to a line on the ATM network 1a side. Furthermore, the ATM multiplexing apparatus 2a demultiplexes multiplexed data which is received from the line on the ATM network 1a side, and transmits this data items to the FR terminal 3, the data terminal 4 and/or the PBX 5. Thus, each of the FR terminal 3, the data terminal 4 and the PBX 5 accommodated in this ATM multiplexing apparatus 2a is enabled to communicate with the FR terminal 3, the data terminal 4 and/or the PBX 5 accommodated in one of other ATM multiplexing apparatuses 2a disposed so as to be opposite to this ATM multiplexing apparatus 2a via the ATM network 1a.

Figure 2:
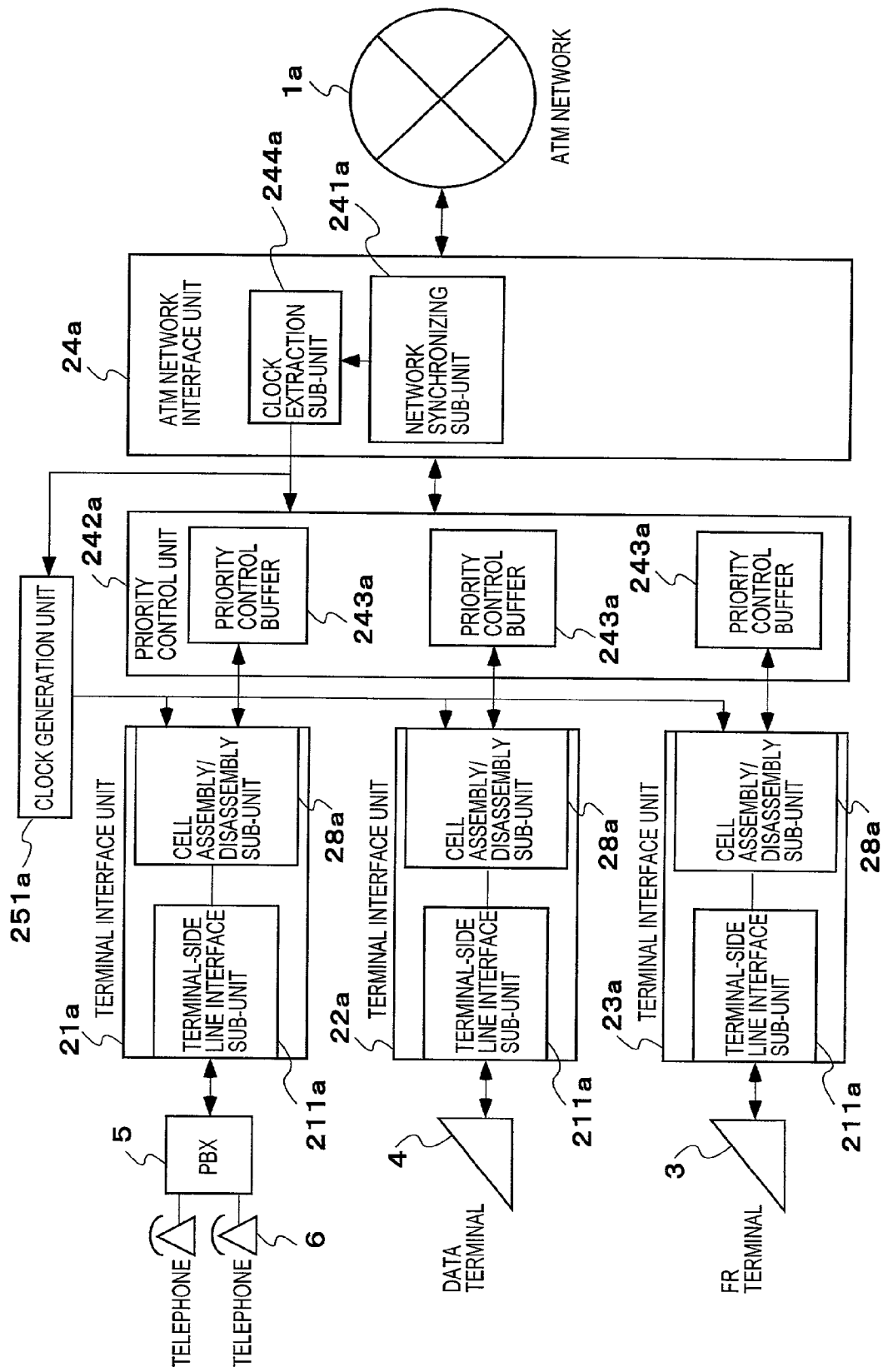
FIG. 2 is a block diagram showing a constitution of the ATM multiplexing apparatus shown in FIG. 1.

A constitution of the ATM multiplexing apparatus 2a shown in FIG. 1 is shown in FIG. 2.

In FIG. 2, reference numerals 21a to 23a denote terminal interface units. Here, the terminal interface unit 21a is a voice line interface unit for accommodating the PBX 5 in which voice terminals such as a telephone 6 are accommodated. The terminal interface unit 22a is a data line interface unit for accommodating the data terminal 4. The terminal interface unit 23a is an FR line interface unit for accommodating the FR terminal 3. Furthermore, reference numeral 24a denotes an ATM network interface unit for accommodating the line on the ATM network 1a side; 242a denotes a priority control unit comprising a priority control buffers 243a each provided for each of the terminal interface units 21a to 23a; and 251a denotes a clock generation unit.

Here, each of the terminal interface units 21a to 23a is directly connected to the corresponding one of the priority control buffers 243a in the priority control unit 242a by the point-to-point connection, that is, without an internal bus which is necessary for the bus arbitration. Each of the priority control buffers 243a sends/receives an ATM cell directly to/from the corresponding one of the terminal interface units 21a to 23a.

In the terminal interface units 21a to 23a, data transmitted from the terminal is received by the terminal-side line interface sub-unit 211a, and then stored in the ATM cell by the cell assembly/disassembly sub-unit 28a. Then, the ATM cell is transmitted to the corresponding one of the priority control buffers 243a in the priority control unit 242a via a corresponding point-to-point connection line. Furthermore, in the terminal interface units 21a to 23a, an ATM cell transmitted from the corresponding priority control buffer 243a in the priority control unit 242a is disassembled by the corresponding one of the cell assembly/disassembly sub-unit 28a, and data is extracted therefrom. Then, the extracted data is transmitted to the terminal from the terminal-sideline interface sub-unit 211a.

Each of the priority control buffers 243a in the priority control unit 242a stores the ATM cell transmitted from the corresponding one of the terminal interface sub-units 21a to 23a. The priority control unit 242a retrieves contents of each of the priority control buffers 243a, and sequentially reads out the ATM cell stored in each of the priority control buffers 243a in the order of descending priorities, the priority being stored in a header of each ATM cell, and transmits the ATM cell to the ATM network interface unit 24a. Furthermore, the priority control unit 242a receives an ATM cell transmitted from the ATM network interface unit 24a, and selects one of the terminal interface units 21a to 23a in conformity with a destination of the ATM cell. Then, the priority control unit 242a transmits the ATM cell to the selected one of the terminal interface units 21a to 23a via the corresponding point-to-point connection line.

In the ATM network interface unit 24a, the ATM cell transmitted from the priority control unit 242a is received by the network synchronizing unit 241a, and thereafter synchronized with the line of the ATM network 1a to be transmitted to the line of the ATM network 1a. Moreover, in the ATM network interface unit 24a, the ATM cell transmitted from the line of the ATM network 1a is received by the network synchronizing unit 241 to be transmitted to the priority control unit 242a. In the ATM network interface unit 24a, a clock extraction sub-unit 244a extracts a network clock synchronized with the line of the ATM network 1a.

The clock generation unit 251a generates operation clocks for the priority control unit 242a and the terminal interface units 21a to 23a from the network clock extracted by the clock extraction sub-unit 244a, and distributes the operation clocks thereto.

With such a constitution, in this embodiment, the sending/receiving of the ATM cell between the priority control unit 242a and the ATM network interface unit 24a is performed in synchronization with the network clock extracted by the clock extraction sub-unit 244a, that is, at a speed equal to a transmission speed of the line of the ATM network 1a. Accordingly, it is unnecessary to provide a buffer for regulating the speed in the ATM interface unit 24a. Furthermore, the ATM multiplexing apparatus 2a of this embodiment can deal with various transmission speeds of the line of the ATM network 1a.

The speed of the sending/receiving of the ATM cell between each of the terminal interface units 21a to 23a and the priority control unit 242a may be satisfactorily a speed so that an ATM cell to be transmitted to the line of the ATM network 1a is not lost in the terminal interface units 21a to 23*a* and data to be transmitted to each terminal is not lost in the priority control unit 242*a*.

The first embodiment of the present invention was described as above.

According to this embodiment, each of the terminal interface units 21*a* to 23*a* is connected directly to the corresponding one of the priority control buffers 243*a* in the priority control unit 242*a* by the point-to-point connection. Specifically, the ATM multiplexing apparatus 2*a* of this embodiment adopts the constitution in which an internal bus, which is necessary for the bus arbitration, is not used. Accordingly, it is unnecessary to provide internal bus interface units for the terminal interface units 21*a* to 23*a* and the ATM network interface unit 24*a* and an internal bus control unit for arbitrating the bus right among the devices connected to the internal bus, which were conventionally required. Thus, it is possible to downsize a circuit of the ATM multiplexing apparatus.

Next, a second embodiment of the present invention will be described.

Figure 3:
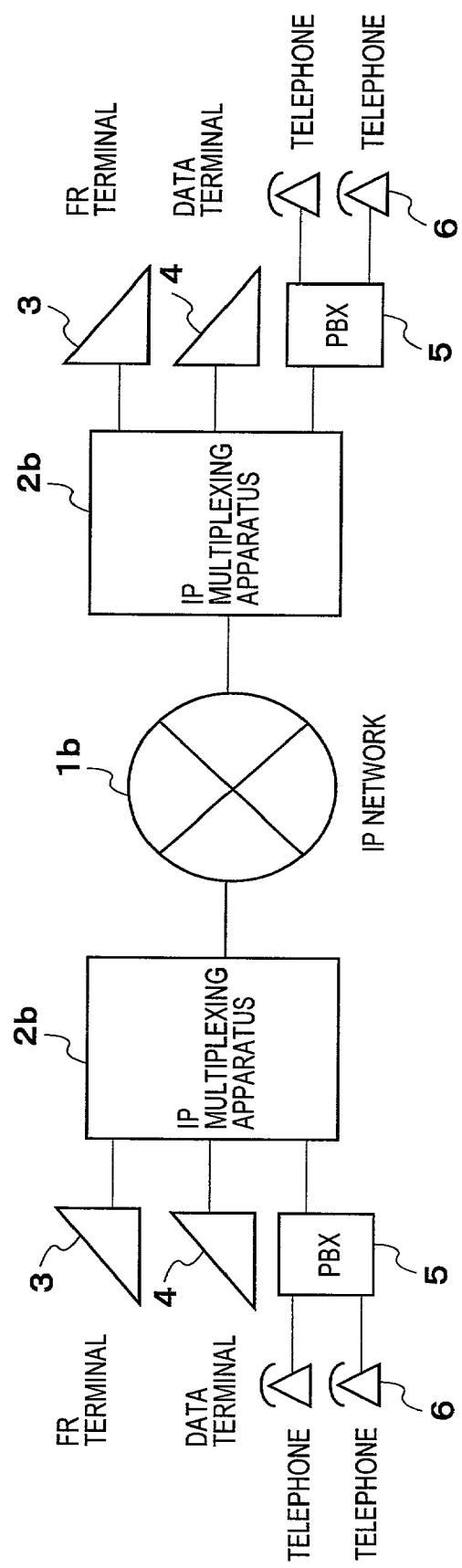
FIG. 3 is a block diagram showing a constitution of a communication system using an IP multiplexing apparatus to which a second embodiment of the present invention is applied.

In FIG. 3, shown is a constitution of a communication system using an IP (Internet Protocol) multiplexing apparatus to which the second embodiment of the present invention is applied. Here, constituent components having identical functions to those of the constituent components shown in FIG. 1 are denoted by the identical reference numerals.

In FIG. 3, reference numeral 1*b* denotes an IP network, and reference numeral 2*b* denotes an IP multiplexing apparatus to which the second embodiment of the present invention is applied.

In such a constitution, the IP multiplexing apparatus 2*b* multiplexes data items received from the FR terminal 3, the data terminal 4 and/or the PBX 5, which are accommodated therein, and transmits the multiplexed data to a line on the IP network 1*b* side. The IP multiplexing apparatus 2*b* demultiplexes multiplexed data received from the line on the IP network 1*b* side, and transmits data items to the FR terminal 3, the data terminal 4 and/or the PBX 5. Thus, each of the FR terminal 3, the data terminal 4 and the PBX 5 accommodated in this IP multiplexing apparatus 2*b* is enabled to communicate with the FR terminal 3, the data terminal 4 and/or the PBX 5 accommodated in one of other IP multiplexing apparatuses 2*b* disposed so as to be opposite to this IP multiplexing apparatus 2*b* via the IP network 1*b*.

Figure 4:
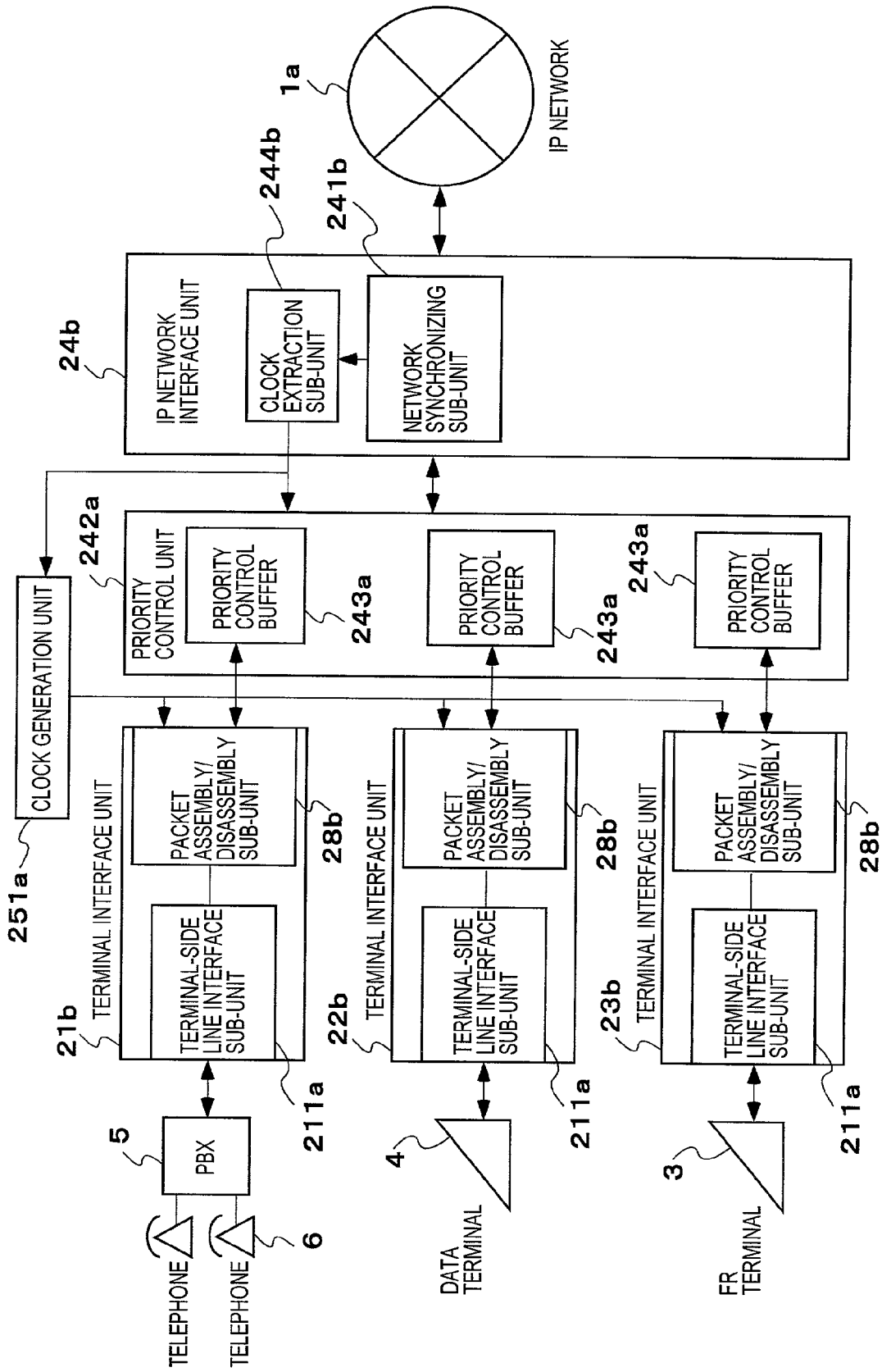
FIG. 4 is a block diagram showing a constitution of the IP multiplexing apparatus shown in FIG. 3.
Figure 5:
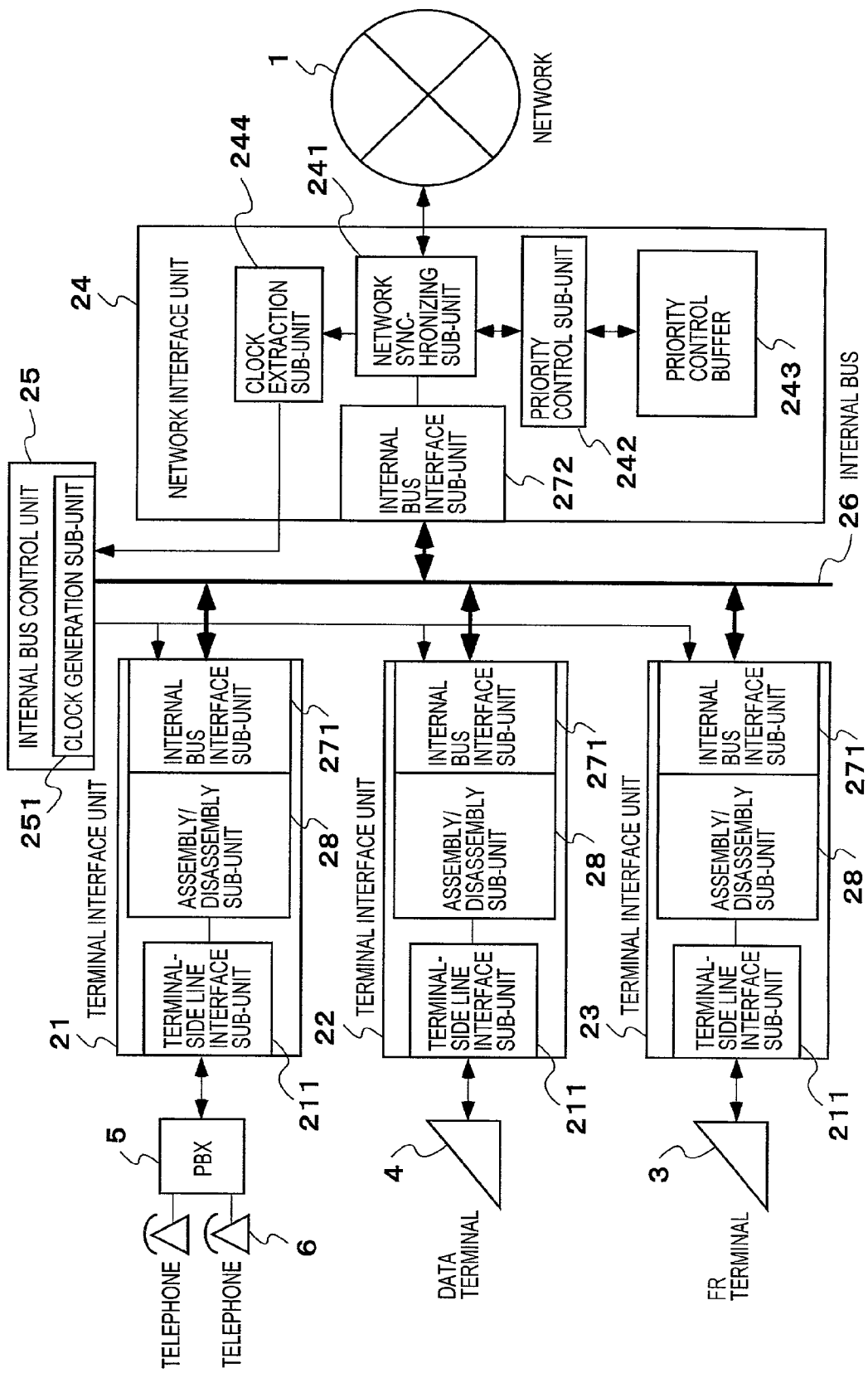
FIG. 5 is a block diagram showing a constitution of a conventional multiplexing apparatus.

A constitution of the IP multiplexing apparatus 2*b* shown in FIG. 3 is shown in FIG. 4. Here, constituent components having identical functions to those of the constituent components shown in FIG. 2 are denoted by the identical reference numerals.

In FIG. 4, reference numerals 21*b* to 23*b* denote terminal interface units. Here, the terminal interface unit 21*b* is a voice line interface unit for accommodating the PBX 5 in which voice terminals such as telephones 6 are accommodated. The terminal interface unit 22*b* is a data line interface unit for accommodating the data terminal 4. The terminal interface unit 23*b* is an FR line interface unit for accommodating the FR terminal 3. Furthermore, reference numeral 24*b* denotes an IP network interface unit for accommodating the line of the IP network 1*b*.

Here, each of the terminal interface units 21*b* to 23*b* is directly connected to the corresponding one of the priority control buffers 243*a* in the priority control unit 242*a* by the point-to-point connection, that is, without an internal bus which is necessary for the bus arbitration. Each of the priority control buffers 243*a* sends/receives an IP packet directly to/from the corresponding one of the terminal interface units 21*b* to 23*b*.

In the terminal interface units 21*b* to 23*b*, data transmitted from the terminal is received by the terminal-side line interface sub-unit 211*a*, and then converted to the IP packet by the packet assembly/disassembly sub-unit 28*b*. Then, the IP packet is transmitted to the corresponding one of the priority control buffers 243*a* in the priority control unit 242*a* via a corresponding point-to-point connection line. Furthermore, in the terminal interface units 21*b* to 23*b*, an IP packet transmitted from the corresponding priority control buffer 243*a* in the priority control unit 242*a* is disassembled by the corresponding one of the packet assembly/disassembly sub-unit 28*b*, and data is extracted therefrom. Then, the extracted data is transmitted to the terminal from the terminal-side line interface sub-unit 211*a*.

Each of the priority control buffers 243*a* in the priority control unit 242*a* stores the IP packet transmitted from the corresponding one of the terminal interface sub-units 21*b* to 23*b*. The priority control unit 242*a* retrieves contents of each of the priority control buffers 243*a*, and sequentially reads out the IP packet stored in each of the priority control buffers 243*a* in the order of descending priorities, the priority being stored in a header of each IP packet, and transmits the IP packet to the IP packet interface unit 24*b*. Furthermore, the priority control unit 242*a* receives an IP packet transmitted from the IP network interface unit 24*b*, and selects one of the terminal interface units 21*b* to 23*b* in conformity with a destination of the IP packet (IP address). Then, the priority control unit 242*a* transmits the IP packet to the selected one of the terminal interface units 21*b* to 23*b* via the corresponding point-to-point connection line.

In the IP network interface unit 24*b*, the IP packet transmitted from the priority control unit 242*a* is received by a network synchronizing unit 241*b*, and thereafter synchronized with the line of the IP network 1*b* to be transmitted to the line of the IP network 1*b*. Moreover, in the IP network interface unit 24*b*, the IP packet transmitted from the line of the IP network 1*b* is received by the network synchronizing unit 241*b* to be transmitted to the priority control unit 242*a*. In the IP network interface unit 24*b*, a clock extraction sub-unit 244*b* extracts a network clock synchronized with the line of the IP network 1*b*.

The clock generation unit 251*a* generates operation clocks for the priority control unit 242*a* and the terminal interface units 21*b* to 23*b* from the network clock extracted by the clock extraction sub-unit 244*b*, and distributes the operation clocks thereto.

With such a constitution, in this embodiment, the sending/receiving of the IP packet between the priority control unit 242*a* and the IP network interface unit 24*b* is performed in synchronization with the network clock extracted by the clock extraction sub-unit 244*b*, that is, at a speed equal to a transmission speed of the line of the IP network 1*b*. Accordingly, it is unnecessary to provide a buffer for regulating the speed in the IP interface unit 24*b*. Furthermore, the IP multiplexing apparatus 2*b* of this embodiment can deal with various transmission speeds of the line of the IP network 1*b*.

The speed of the sending/receiving of the IP packet between each of the terminal interface units 21*b* to 23*b* and the priority control unit 242*a* may be satisfactorily a speed so that an IP packet to be transmitted to the line of the IP network 1*b* is not lost in the terminal interface units 21*b* to 23*b* and data to be transmitted to each terminal is not lost in the priority control unit 242*a*.

The second embodiment of the present invention was described as above.

In this embodiment, similarly to the foregoing first embodiment, each of the terminal interface units 21*b* to 23*b* is directly connected to the corresponding one of the priority control buffers 243a in the priority control unit 242a by the point-to-point connection. Specifically, the IP multiplexing apparatus 2b of this embodiment adopts the constitution in which an internal bus which is necessary for the bus arbitration is not used. Accordingly, it is unnecessary to provide internal bus interface units for the terminal interface units 21b to 23b and the IP network interface unit 24b and an internal bus control unit for arbitrating the bus right among the devices connected to the internal bus, which were conventionally required. Thus, it is possible to downsize a circuit of the IP multiplexing apparatus.

It should be noted that the present invention is not limited to the foregoing embodiments, and various changes, substitution and alternations can be made therein without departing from spirit and scope of the invention.

In the foregoing embodiments, for example, adopted is the constitution in which the priority control buffer 243a is provided for each terminal interface unit, and each priority control buffer 243a is directly connected to the corresponding one of the terminal interface units by the point-to-point connection. However, the present invention is not limited to this. In the priority control unit 242a, an input/output interface sub-unit may be satisfactorily provided for each terminal interface unit. A constitution in which each input/output interface sub-unit is directly connected to the corresponding one of the terminal interface units by the point-to-point connection may be adopted. In this case, the priority control unit 242a controls writing/reading of data to/from the priority control buffer 243a, whereby the number of the priority control buffers 243a may be one.

Furthermore, the first and second embodiments were described by exemplifying the ATM multiplexing apparatus connected to the ATM network 1a and the IP multiplexing apparatus connected to the IP network 1b, respectively. However, the present invention is not limited to these. The present invention can be applied to a multiplexing apparatus which accommodates lines from a plurality of terminals, converts data transmitted from each terminal to packet type data items, and multiplexes the data items to transmit to a network.

As described above, according to the present invention, the circuit size of the multiplexing apparatus can be reduced.

What is claimed is:

1. A multiplexing apparatus comprising:
    a plurality of terminal interface units, each accommodating a line on a terminal side;
    a priority control sub-unit which connects said terminal interface units; and
    a network interface unit connected to said priority control sub-unit, the network interface unit accommodating a line on a network side,
    wherein each of said terminal interface units converts data received from the line on the terminal side to a packet type data as a certain unit, which is determined by a protocol adopted in said network, and transmits the packet type data to the priority control sub-unit,
    wherein each of said terminal interface units disassembles packet type data received from the priority control sub-unit, and extracts data to transmit the data onto the corresponding line on said terminal side,
    wherein said priority control sub-unit, including a plurality of packet type data storing units in corresponding relationships to said terminal interface units for storing the packet type data received from a plurality of said terminal interface units, reads out the packet type data sequentially in a predetermined order from the plurality of packet type data storing units to transmit the packet type data to said network interface unit, stores in the packet type data storing unit in conformity with a destination of the packet type data received from said network interface unit, and transmits the packet type data to the terminal interface unit in conformity with the destination of the packet type data being received, and
    wherein said network interface unit synchronizes the packet type data received from said priority control sub-unit with the line on said network side to transmit the synchronized packet type data to the line on said network side, and transmits the packet type data received from the line on said network side to said priority control sub-unit.

2. The multiplexing apparatus according to claim 1, wherein a transmission speed of the packet type data between said priority control sub-unit and said network interface unit is coincident with a transmission speed of the line on said network side.

3. The multiplexing apparatus according to claim 1, wherein said packet type data storing unit is directly connected to the corresponding terminal interface unit by the point-to-point connection.

4. The multiplexing apparatus according to claim 1, wherein the line on said network side is an ATM (Asynchronous Transfer Mode) line, and said packet type data is an ATM cell.

5. The multiplexing apparatus according to claim 1, wherein the line on said network side is an IP (Internet Protocol) line, and said packet type data is an IP packet.

* * * * *